US010387023B2

(12) United States Patent
Grasso et al.

(10) Patent No.: US 10,387,023 B2
(45) Date of Patent: *Aug. 20, 2019

(54) GOING ON LOCATION FEASIBILITY

(71) Applicant: Ensco Services Limited, London (GB)

(72) Inventors: Barton D. Grasso, Houston, TX (US);
Frank Strachan, Houston, TX (US);
Jose H. Vazquez, Houston, TX (US)

(73) Assignee: Ensco Services Limited, London (GB)

( * ) Notice: Subject to any disclaimer, the term of this patent is extended or adjusted under 35 U.S.C. 154(b) by 337 days.

This patent is subject to a terminal disclaimer.

(21) Appl. No.: 15/218,935

(22) Filed: Jul. 25, 2016

(65) Prior Publication Data

US 2017/0058475 A1 Mar. 2, 2017

Related U.S. Application Data

(60) Provisional application No. 62/209,407, filed on Aug. 25, 2015.

(51) Int. Cl.
*G06F 3/0484* (2013.01)
*E02B 1/00* (2006.01)
(Continued)

(52) U.S. Cl.
CPC ............ *G06F 3/04847* (2013.01); *E02B 1/00* (2013.01); *E02B 17/00* (2013.01); *E02B 17/021* (2013.01);
(Continued)

(58) Field of Classification Search
CPC .................................................... G06F 3/04847
(Continued)

(56) References Cited

U.S. PATENT DOCUMENTS 4,227,831 A * 10/1980 Evans .................... E02B 17/021
405/196
4,735,526 A * 4/1988 Kawagoe .............. E02B 17/021
405/196
(Continued)

FOREIGN PATENT DOCUMENTS

CN 104280457 1/2015
CN 105004506 10/2015
(Continued)

OTHER PUBLICATIONS

Kostelnik et al., "Jack-up Mobilization in a Complex Soil Environment Including Mitigative "swiss Cheese" Operation,", IADC/SPE Asia Pacific Drilling Technology Conference and Exhibition, Sep. 15, 2004, 14 pgs.
(Continued)

*Primary Examiner* — Ricky Ngon
(74) *Attorney, Agent, or Firm* — Fletcher Yoder, P.C.

(57) ABSTRACT

Techniques and devices to assist an offshore unit in going on location and coming off location. A device may include an interface configured to receive a signal indicative of motions of an offshore unit. The device may also include a memory configured to store a set of values corresponding to acceptable motions of the offshore unit, as well as a processor configured to determine if a measured motion of the offshore unit exceeds at least one value of the set of values and generate an indication that going on location by the offshore unit can be undertaken when the processor determines that the measured motion of the offshore unit is less than or equal to the at least one value.

20 Claims, 10 Drawing Sheets

(51) Int. Cl.
*E02B 17/00* (2006.01)
*E02B 17/02* (2006.01)

(52) U.S. Cl.
CPC . *E02B 2017/006* (2013.01); *E02B 2017/0082* (2013.01)

(58) Field of Classification Search
USPC .......................................................... 702/127
See application file for complete search history.

(56) References Cited

U.S. PATENT DOCUMENTS

| | | | | |
|---|---|---|---|---|
| 4,819,730 | A * | 4/1989 | Williford | E21B 7/128 114/144 B |
| 5,088,859 | A * | 2/1992 | Devlin | B63B 21/502 405/211 |
| 6,981,822 | B2 | 1/2006 | Ingle | |
| 7,404,443 | B2 * | 7/2008 | Patton | E21B 19/22 166/355 |
| 7,430,461 | B1 | 9/2008 | Michaels | |
| 2002/0059467 | A1 | 5/2002 | Rapp et al. | |
| 2005/0199056 | A1 | 9/2005 | Strong et al. | |
| 2006/0062637 | A1 * | 3/2006 | Foo | E02B 17/08 405/198 |
| 2008/0289876 | A1 * | 11/2008 | King | E21B 44/00 175/40 |
| 2009/0090191 | A1 * | 4/2009 | Lenders | E02B 17/0818 73/786 |
| 2010/0050764 | A1 | 3/2010 | Foo et al. | |
| 2011/0231797 | A1 | 9/2011 | Huhtala et al. | |
| 2012/0050056 | A1 * | 3/2012 | Lenders | G01L 3/02 340/665 |
| 2012/0171034 | A1 * | 7/2012 | Gabeiras | F03D 7/0204 416/1 |
| 2014/0147216 | A1 * | 5/2014 | Stephens | G01L 5/00 405/196 |
| 2014/0218515 | A1 | 8/2014 | Armendariz et al. | |
| 2014/0250442 | A1 * | 9/2014 | Reinhardt | G06F 9/542 719/318 |
| 2014/0284296 | A1 * | 9/2014 | Appels | B66C 13/48 212/276 |
| 2017/0044847 | A1 * | 2/2017 | Pinckard | E21B 19/006 |
| 2017/0204705 | A1 * | 7/2017 | King | E21B 44/00 |
| 2017/0321653 | A1 * | 11/2017 | Rebsdorf | F03D 7/0228 |
| 2018/0298754 | A1 * | 10/2018 | Kodaira | E02F 7/065 |

FOREIGN PATENT DOCUMENTS

| | | |
|---|---|---|
| KR | 20130135124 | 12/2013 |
| WO | 2007088339 | 8/2007 |

OTHER PUBLICATIONS

Renewable UK, "Guidelines for the Selection and Operation of Jack-ups in the Marine Renewable Energy Industry," Issue 2, 2013, 110 pgs.

PCT Application No. PCT/IB2016/055083 International Search Report & Written Opinion dated Nov. 24, 2016; 13 Pages.

* cited by examiner

GOING ON LOCATION FEASIBILITY

CROSS REFERENCE TO RELATED APPLICATIONS

This application is a Non-Provisional Application claiming priority to U.S. Provisional Patent Application No. 62/209,407, entitled "Using Onboard Sensor Data to Assess Feasibility of Jackups to go on Location", filed Aug. 25, 2015, which is herein incorporated by reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

This invention relates to mobile offshore units, specifically self-elevating units. Self-elevating units are used in the offshore industry for a multitude of tasks including but not limited to drilling and production operations, general construction operations, crew accommodation, wind-turbine installation, etc. Self-elevating units can refer to jackups, liftboats, jackup barges, mobile offshore drilling units (MODUs), mobile offshore production units (MOPUs), or the like.

Self-elevating units (henceforth referred to as "units") are typically constructed of a hull, supported on one or more legs which extend through or on the side of the hull. A lifting system or "jacking system" is installed on the unit for the purpose of raising or lowering the legs relative to the hull. The self-elevating unit is designed such that the hull is buoyant and can float, supporting itself and the legs and its cargo (e.g., in an "afloat" mode). Once the self-elevating unit reaches the desired location where it is to operate, the legs are lowered to the seabed and the hull is raised above the waterline (e.g., in an "elevated" mode), so that there is no longer a buoyancy force on the hull, creating a stable platform with a positive airgap. One of the first steps in the process of transitioning from afloat to elevated mode is commonly referred to as "going on location."

Conversely, the process of transitioning from elevated mode to afloat mode is commonly referred to as "coming off location." The self-elevating unit lowers its hull from positive air gap into the water, partially submerging the hull. The jacking system lowers the hull until the buoyancy of the hull is sufficient to extract and raise the legs. The legs of the self-elevating unit typically incorporate a footing that provides the bearing or contact surface between the seabed (and/or the soil beneath the seabed) and the unit. The legs of a self-elevating unit may have an individual footing for each leg (spudcan) or the legs may share a common footing (mat).

Analysis of units in the elevated and afloat modes is fairly well understood, and standards exist for use in the development of proper operating conditions for both modes of operation. The transition phase for self-elevating units (e.g., going on location or coming off location), however, is not as well understood.

DETAILED DESCRIPTION

Figure 1:
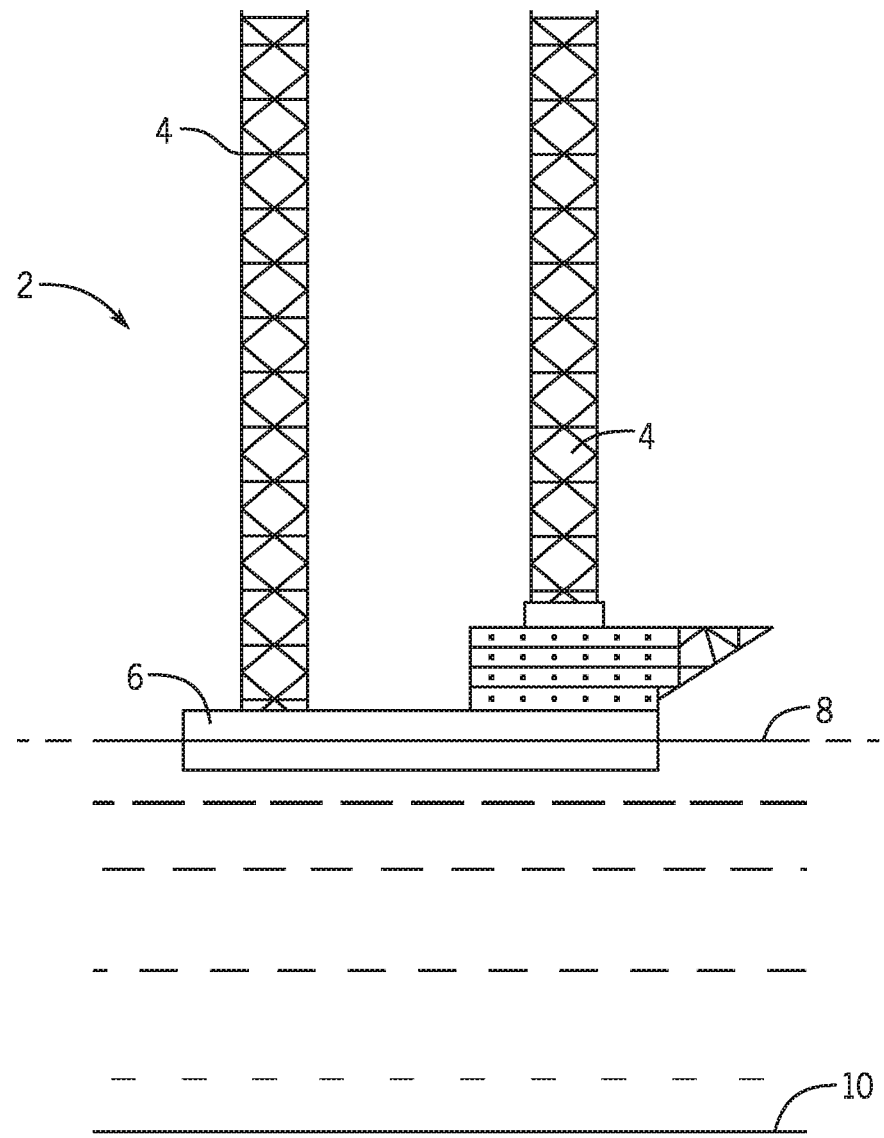
FIG. 1 illustrates a profile view of a self-elevating unit in the afloat mode.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Self-elevating units (which may be referred to as "units") can refer to jackups, liftboats, jackup barges, mobile offshore drilling units (MODUs) (e.g., a platform equipped with a drill rig to engage in offshore oil and gas exploration and/or equipped with maintenance or completion items to engage in work including, but not limited to, casing and tubing installation, subsea tree installations, and well capping), mobile offshore production units (MOPUs), mat rigs, or the like. While calm conditions are desirable while conducting going on location operations, most of the time these operations are carried out in the presence of waves which induce motions on the unit. These wave-induced motions cause the legs to impact the seabed. The degree of impact load on the leg(s) is related to the waves, the soil properties, spudcan shape and the relative timing of jacking. Thus, during the "going on location" phase of a unit, the motions of the unit while afloat can cause severe loading of the legs as they impact the seabed. Typically the personnel responsible for the installation of the unit would use their best judgement and experience to estimate the sea-state and motions of the unit when determining whether a unit can begin going on location operations (e.g., transitioning from afloat mode in which the legs of the unit are not coupled to the seabed to elevated mode in which the legs of the unit are coupled to the seabed). However, the present invention allows for monitoring of conditions that impact going on location by the unit and/or may control the process of going on location accordingly. In this manner, a decision to install the unit on the seabed (e.g., going on location with the unit) may be made with greater information than previously available and/or utilized. In some embodiments, one or more onboard instruments may be utilized in the determination of whether it is feasible (e.g., appropriate) to install the unit onto the seabed based on, for example, prevailing conditions at sea.

For example, onboard instrumentation can be used to determine the motions of the unit, thus eliminating determinations of a specific sea state (e.g., dominant wave height, period, direction, and/or whether the wave is swell-dominated or wind-driven dominated). For example, motion of the unit may be measured by one or more onboard sensors, and the data collected may be analyzed to provide a comparison of the unit's motions against the acceptable values. Determinations of whether it is appropriate for the unit to go on location may then be made based upon the analyzed data.

With the foregoing in mind, FIG. 1 illustrates an offshore platform comprising a self-elevating unit 2 (which may be referred to as a unit 2). Although the presently illustrated embodiment of an offshore platform is of a particular offshore self-elevating unit 2, other offshore platforms may be substituted for the self-elevating unit 2. The techniques and systems described below are described in conjunction with self-elevating unit 2 and are intended to cover at least jackups, liftboats, jackup barges, mobile offshore drilling units (MODUs), mobile offshore production units (MOPUs), mat rigs, or the like.

The present unit 2 may include one or more systems that allow for a going on location analysis of the unit 2. The one or more systems may utilize onboard motion data to assist in the decision as to whether the conditions for installing the unit 2 on location are acceptable and/or control the going on location of the unit 2. The self-elevating unit 2 includes one or more legs 4 and the unit 2 is capable of floating on a buoyant hull 6, which may also operate to support the legs 4 of the unit 2. As illustrated in FIG. 1, the unit 2 is operating in an afloat mode as its mode of operation, whereby the unit 2 has its legs fully raised relative to the waterline 8 above a seabed 10.

Technically speaking, FIG. 1 shows the unit in the afloat mode with its legs fully raised (as it is also in the afloat mode when the legs are near the seabed, as long as the legs never touch the seabed). As described in this paragraph, it is more like a "transit" mode rather than just an "afloat" mode. Of course, in order to be able to transit, the unit must be floating.

Figure 2:
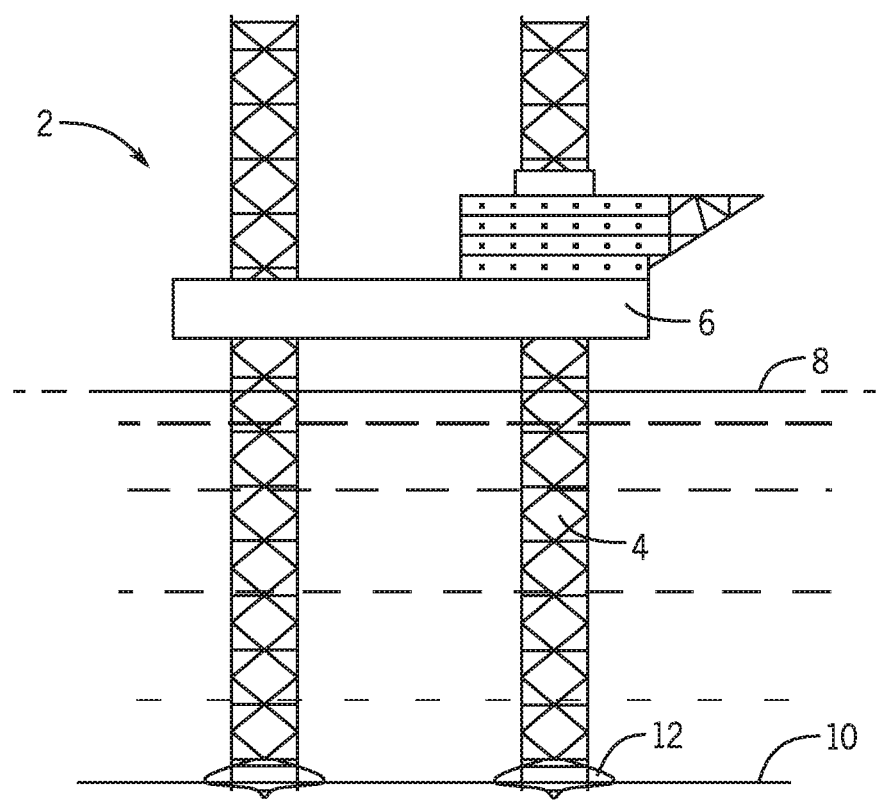
FIG. 2 illustrate a profile view of a self-elevating unit in the elevated mode.

As illustrated in FIG. 2, the legs 4 of the unit 2 are able to be lowered onto the seabed 10 so that the unit 2 and the hull 6 may be raised above the waterline 8 so that the unit 2 may operate as a stable platform. This mode of operation is considered an elevated mode. While in the elevated mode, footings 12 (e.g., spudcans or the like) at the bottom of the legs 4, provide a bearing surface for transmitting loads between the unit 2 and the seabed 10.

Figure 3:
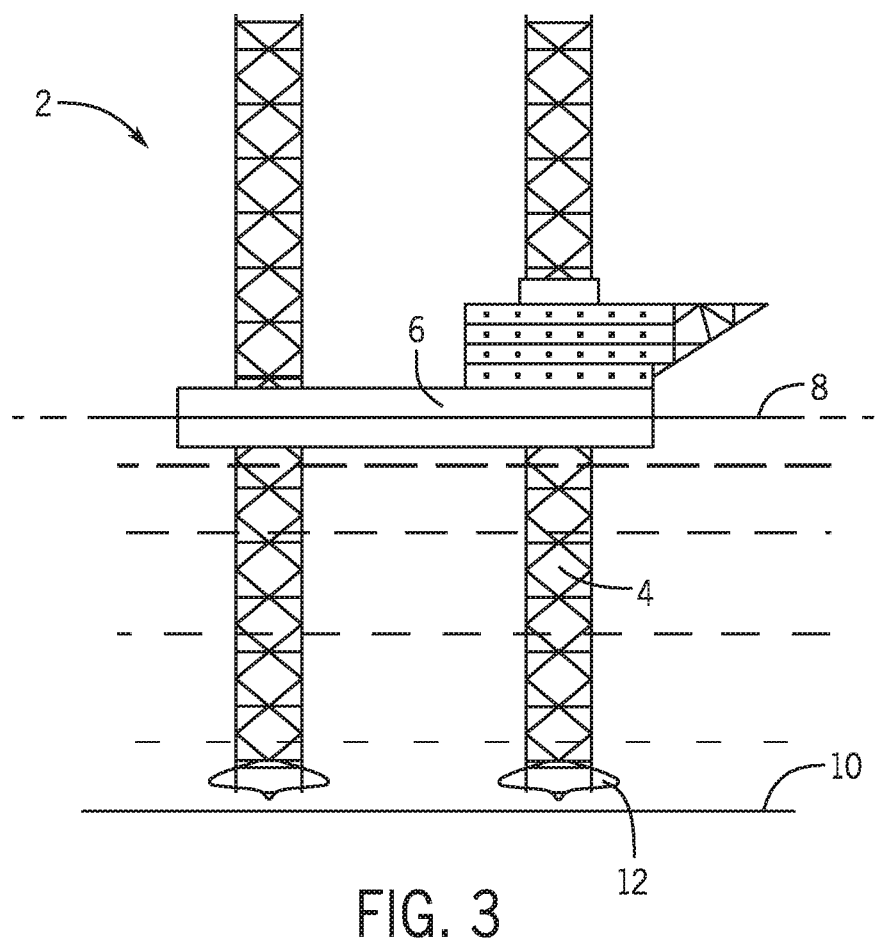
FIG. 3 illustrates a profile view of a self-elevating unit during the transition segment from afloat to elevated mode.
Figure 4:
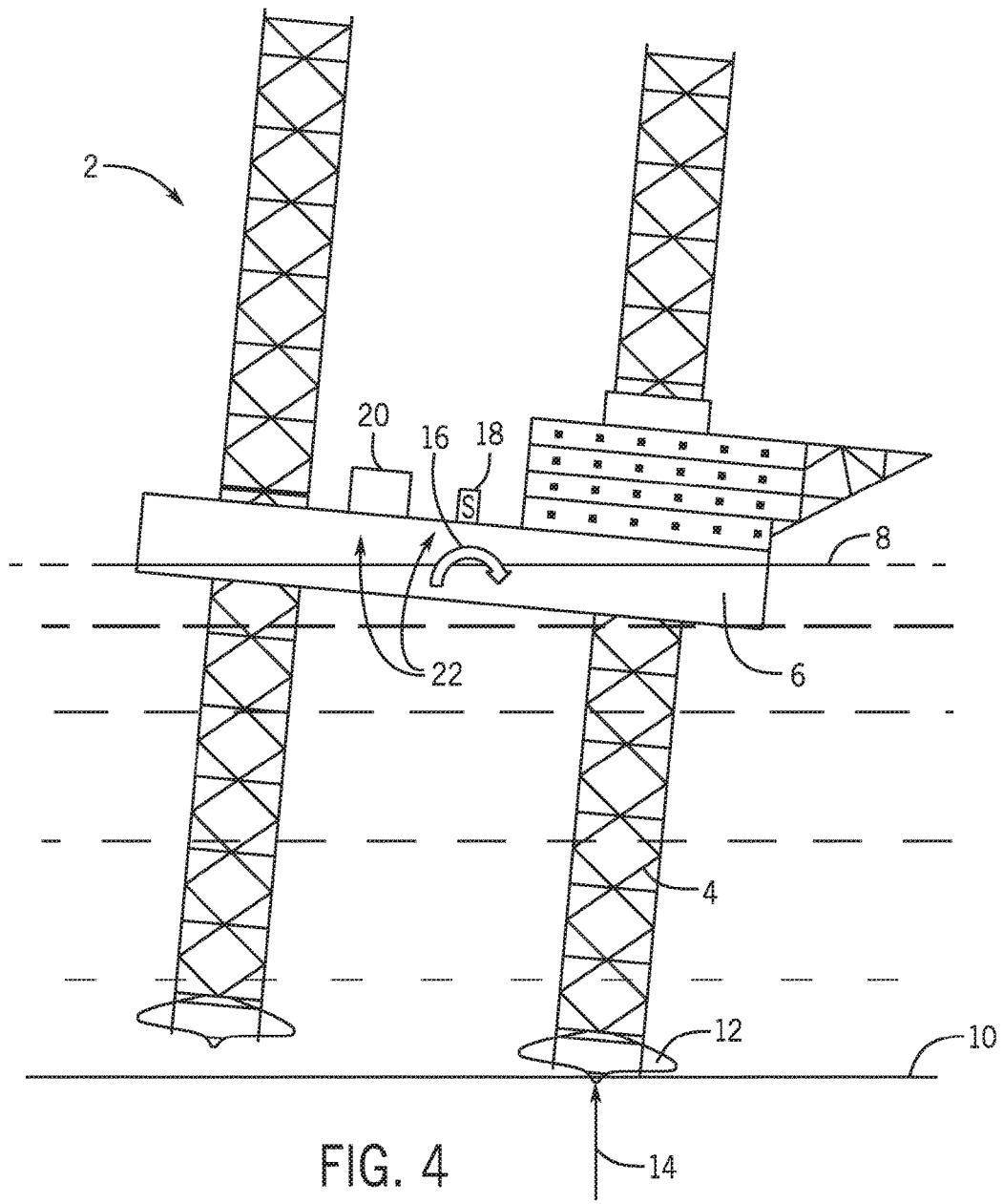
FIG. 4 illustrates a profile view of a self-elevating unit making impact with the seabed during the transition segment from afloat to elevated mode.

The initial process of transitioning from an afloat mode to an elevated mode of a unit 2 is commonly referred to as "going on location" and is illustrated as a transition segment (e.g., a going on location segment) in FIG. 3. As illustrated, during a going on location operation of a unit 2, there is a time between when the legs 4 are lowered to make contact with the seabed 10 and the time at which all legs 4 remain in contact with the seabed 10 and the draft of the hull 6 begins to decrease due to jacking of the hull 6. Moreover, as illustrated in FIG. 4, during the transition segment of operation (e.g., while the unit 2 is going on location), impact loads 14 can occur on the footings 12, for example, due to motions 16 of the unit 2. These impact loads 14 can potentially cause damage and, thus, acceptable limits for going on location and installing the unit 2 at a given location on the seabed 10 should be determined (e.g., determining whether motions 16 exceed one or more levels, which may indicate a likelihood of an excessive impact load 14 if the unit 2 begins to go on location when these motions 16 are observed).

In one embodiment, at least one sensor 18 and a control monitor 20 may be utilized as a control system 22 to allow for determinations of whether a unit 2 is able to go on location. Additionally, in some embodiments, the control system 22 may also control at least a part of the going on location transitioning of the unit 2. The control system 22, made up of at least one sensor 18 and the control monitor 20, may operate to, for example, determine if the unit 2 is within the predetermined acceptable operating limits for installing the unit 2 on location by combining and/or comparing of onboard motion data (e.g., measured and transmitted by the sensor 18 to the control monitor 20) with the acceptable criteria. Based on this measured onboard motion data, actual response information (e.g., measured motion) of the unit 2 in response to, for example, environmental conditions may be generated to allow for greater precision in determining the feasibility of going on location at any particular time in real time or near real time (e.g., based on currently measured motion data of the unit 2 by the sensor 18).

Figure 5:
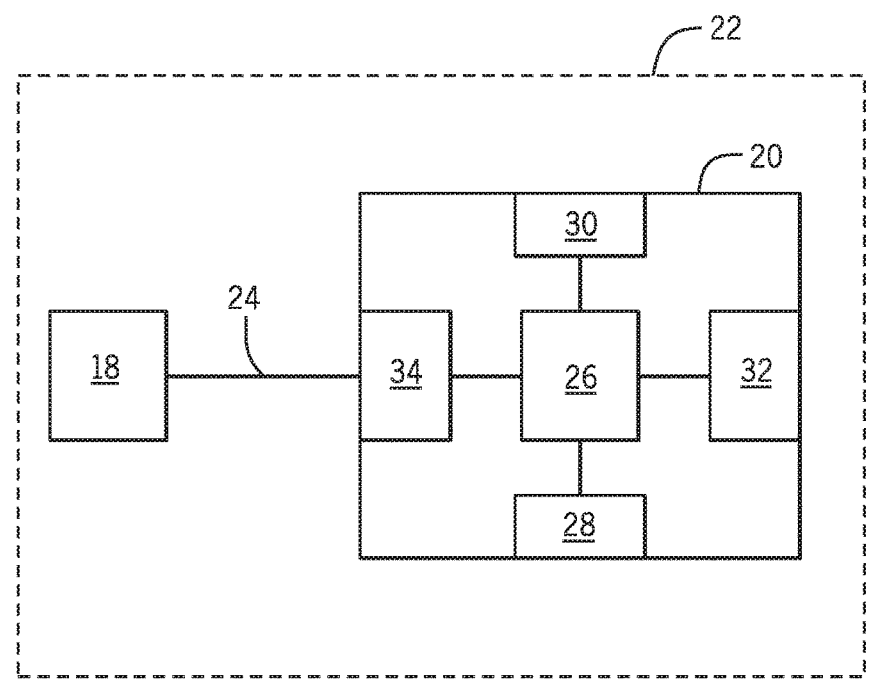
FIG. 5 illustrates a schematic of a control system of a self-elevating unit.

FIG. 5 illustrates an embodiment of the control system 22 inclusive of the sensor 18 and the control monitor 20. The sensor 18 may be representative of one or more motion detection sensors such as a gyroscope, an accelerometer, or the like and the sensor 18 may measure the motion of the unit 2, for example, in response to environmental factors (e.g., waves and/or currents affecting the unit 2). The sensor 18 may be disposed on, for example, the hull 6, one or more legs 4, and/or one or more footings 12. The sensor 18 may operate to measure the motion of one or more portions of the unit 2 and transmit the measured data to the control monitor 20 along path 24 for use by the control monitor 20 in determining whether the unit 2 may go on location. Path 24 may be a hardwired connection or a wireless connection and reception of the measured data along path 24 will be described below in greater detail.

In some embodiments, the control monitor 20 illustrated in FIG. 5 may be a computing system, such as a general purpose or a special purpose computer. For example, the control monitor 20 may include a processing device 26, such as one or more application specific integrated circuits (ASICs), one or more processors, or another processing device that interacts with one or more tangible, non-transitory, machine-readable media (e.g., memory 28) of the control monitor 20 that collectively stores instructions executable by the processing device 26 to perform the methods and actions described herein. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by the processing device 26.

Thus, the control monitor 20 may include a processing device 26 that may be operably coupled with the memory 28 to perform various algorithms. In this manner, programs or instructions executed by the processing device 26 may be stored in any suitable article of manufacture that includes one or more tangible, non-transitory computer-readable media at least collectively storing the instructions or routines, such as the memory 28. Additionally, the control monitor 20 may include a display 30 that may be a liquid crystal display (LCD) or another type of display that allows users to view images generated by the control monitor 20. The display 30 may include a touch screen, which may allow users to interact with a graphical user interface of the control monitor 20. Likewise, the control monitor 20 may additionally and/or alternatively transmit images to a display of an additional control device, for example, a separate control monitor of the unit 2.

The control monitor 20 may also include one or more input structures 32 (e.g., one or more of a keypad, mouse, touchpad, touchscreen, one or more switches, buttons, or the like) to allow a user to interact with the control monitor 20, such as to start, control, or operate a graphical user interface (GUI) or other applications running on the control monitor 20. As may be appreciated, a GUI may be a type of user interface that allows a user to interact with the control monitor 20 and/or the control system 22 through, for example, graphical icons, visual indicators, and the like. Additionally, the control monitor 20 may include network interface 34 to allow the control monitor 20 to interface with various other electronic devices. The network interface 34 may include a Bluetooth interface, a local area network (LAN) or wireless local area network (WLAN) interface, an Ethernet connection, or the like. As illustrated, the network interface 34 may be coupled to path 24, in part, to receive the measured data from sensor 18 and the network interface 34 may operate to transmit the received data to the processing device 26.

As will be described in greater detail below, the measured data received from the sensor 18 may be utilized by the control monitor 20 to generate an alarm that may, for example, be displayed on display 30 to indicate that going on location should not be undertaken. For example, the control monitor 20 may receive data from the sensor 18 and may utilize the received data in conjunction with predetermined and/or pre-stored values to identify and display whether the unit 2 may proceed with going on location, display operational limits for the unit 2 to go on location, display values indicative of how close to the current environmental conditions affecting the unit 2 are to the operational limits, display trends in the current conditions of the unit 2 with respect to previously received data, and/or initiate or control the going on location operation of the unit 2. Some or all of this information may be calculated and/or displayed on the display 30.

Figure 6:
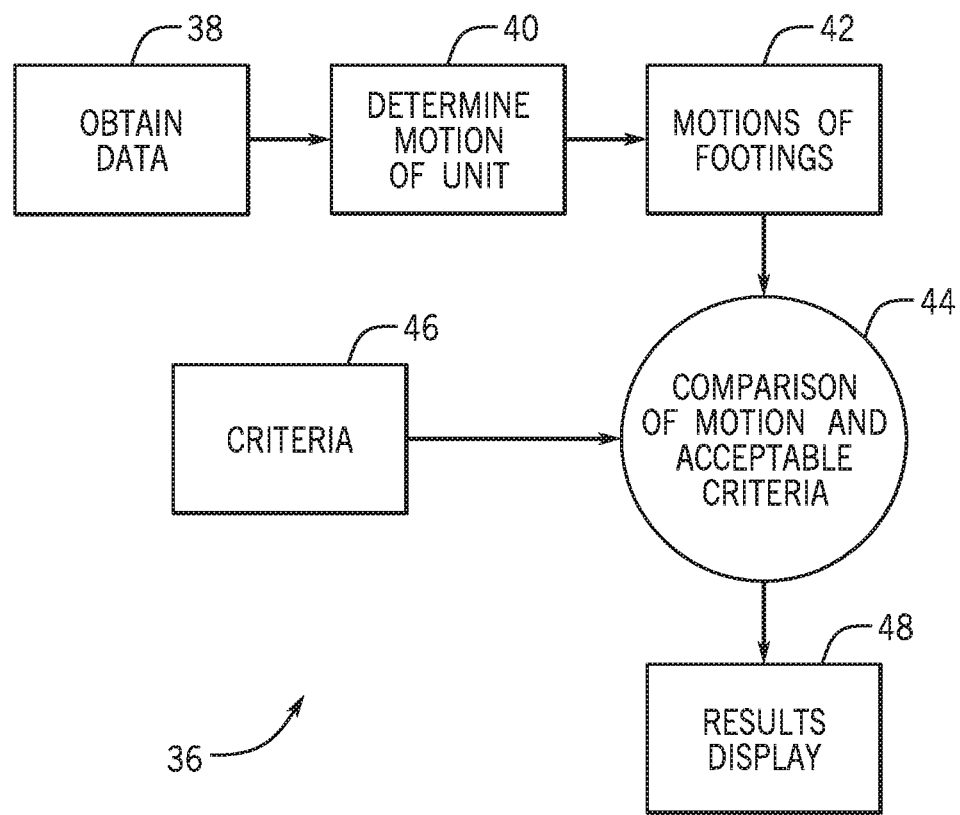
FIG. 6 illustrates a flow chart of operation of the control system of FIG. 5.

An example of a methodology for incorporating rig motion data from onboard instrumentation into a going on location decision for a unit 2 may be generally illustrated in the flow chart 36 of FIG. 6. In step 38, onboard instrumentation (e.g., sensor 18) may be utilized to obtain the data indicative of motions of the unit 2. This data, in step 40, may be transmitted, for example, to the control monitor 20 for determination of motion of the unit 2 based on the received data. The determination of the motion of the unit may include, for example, processing of the received data from the sensor 18 to produce motion data that can be used to determine one or more angular motion components, ($\theta_x$, $\theta_y$, $\theta_z$), one or more angular velocities (e.g., three angular velocity components, ($\dot{\theta}_x$, $\dot{\theta}_y$, $\dot{\theta}_z$)) and/or one or more translational accelerations (e.g., three translational acceleration components, ($\ddot{x}$, $\ddot{y}$, $\ddot{z}$)). The one or more angular motion components, one or more angular velocity components and/or the one or more translational acceleration components may be utilized to determine statistics of interest. The determined statistics (e.g., the determined set of derived statistics of interest) based upon the data received from the sensor 18 (e.g., indicative one or more onboard motion sensors) may be used to determine the motion at each of the footings in step 42. For example, based on the determined motion of the unit, motion at each of the footings 12 may be determined by the control monitor 20, for example, over a series of specified time intervals in step 42. In step 44, acceptable criteria (illustrated in step 46 as being previously and/or simultaneously calculated and stored in the control monitor 20 or as being received and stored at the control monitor 20, for example, from cloud based or other external storage device) may be compared against the motion of the unit 2 and/or the footings 12. This comparison in step 44 may include a comparison of critical statistics against the appropriate permissible curve, for example, based on the soil conditions and/or water depth. For example, the critical statistics may be compared against the permissible curves to aid in the decision for going on location of the unit 2 in step 44.

The acceptable criteria from step 46 may be generated through the use of, for example, a non-linear time-domain response analysis combined with structural and diffraction analyses. The analyses undertaken to generate the acceptable criteria (e.g., critical statistics which may be compared against the current data calculated in step 44) may utilize, for example, water depth, seabed 10 soil conditions, leg-seabed interactions, jacking speed, footing 12 shape, jacking system stiffness and/or the structural capacity of the legs 4, hull 6, and/or the jacking system of the unit 2. The analyses may generate one or more acceptable criteria in step 46 for permissible wave height and/or rotation angle curves vs. period curves for different units 2 at specified sets of water depth, wave direction, and soil conditions. The permissible wave height curves can be achieved by iteration to identify the maximum wave height that produces acceptable structural utilization ratios for all of the various critical components (e.g., critical statistics). Generally, analyses using regular waves may be applied by the control monitor 20 when swells are dominant while analyses using random waves may be applied by the control monitor 20 when wind-driven waves are dominant, which can be determined and entered/selected manually by a user or automatically by the control monitor based on the sensor 18 data received.

Additional factors that may be utilized in step 46 to determine permissible going on location information may include determination and/or application of impact load on the unit 2, which is absorbed as potential spring energy and may differ from the amount of pre-impact kinetic energy. Additionally and/or alternatively, rotational velocity as well as heave of a unit 2 may be utilized in step 46 to determine (e.g., calculate) permissible wave height curves which account for heave and rotation effects. For example, impact load, while related to vertical velocity of the footings 12 prior to impact, is also a function of period, and this is attributable to phase angle effects and the degree to which the vertical motion of the footings 12 is due to heave or rotation (pitch or roll). Accordingly, acceptable criteria curves may be obtained in step 46 by iterating on wave height to find the limiting value that causes any of the structural limits of the unit 2 to reach its allowable capacity.

These criteria curves predetermined for a unit 2 of the type of unit that is going on location may be stored, for example, in the control monitor 20 for use in step 44.

Given the possible sea-state make up and associated response, in step 48, display of the results of the comparison may be made, for example, to make a proper recommendation for installing the unit 2. For example, analytical results generated based on the comparison in step 46 may be used to provide a statistical exceedance probability that may be displayed in step 48, for example, on the display 30 or transferred, for example, via the network interface 34 for display on another display in the unit 2 and/or at a location remote from the unit 2 (e.g., a remote monitoring center). The display of information may include the display of the statistics in such a way that the user easily discerns the dominant response and/or the variations in the response, as well as trends over time (e.g., current statistics moving towards or away from critical statistic levels). Furthermore, by displaying significant and maximum values (e.g., critical statistics), the response can be classified as wind-driven wave dominated or swell dominated.

Figure 7:
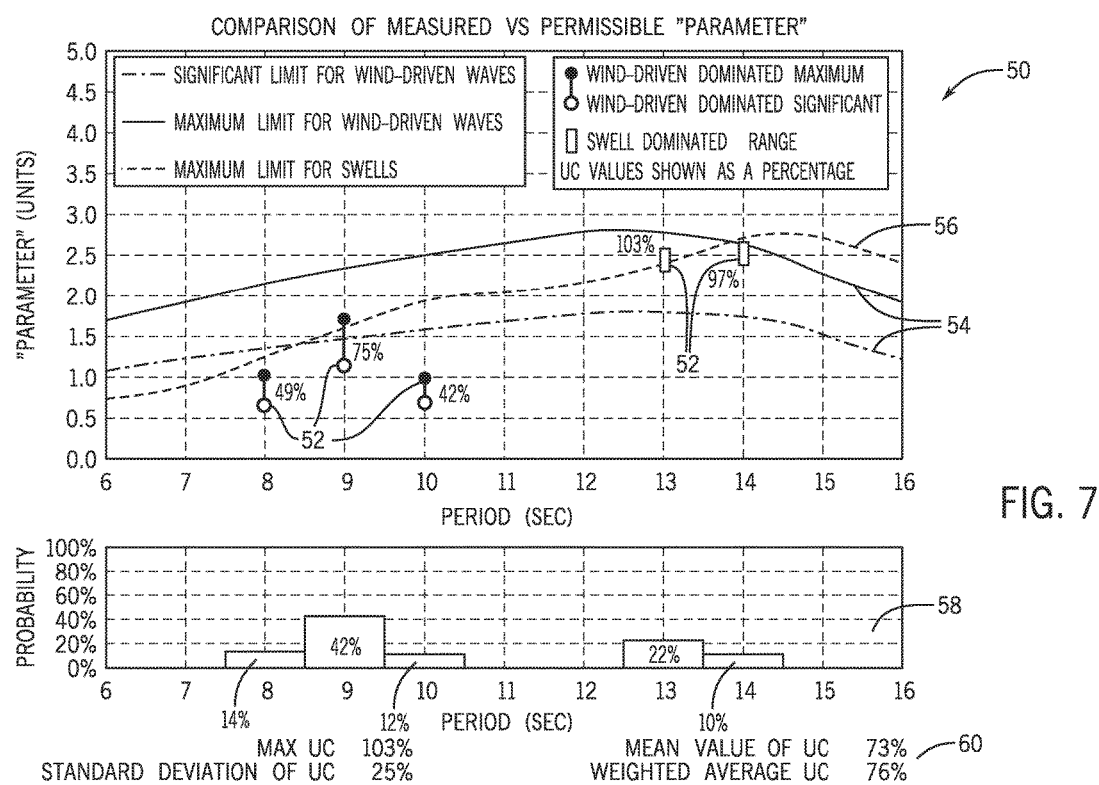
FIG. 7 illustrates a representative screen shot of a display illustrating combined motion statistics with allowable criteria to be used in making a decision for going on location.

One example of the displayed information in step 48 may include a generated plot 50 as illustrated in FIG. 7. The plot 50 illustrates the statistics of the processed onboard motion data 52 (e.g., from step 42) against the acceptable criteria curves 54 (e.g., from step 46) for a given parameter (i.e., angles, velocity, etc.) as the output of step 44. This plot may include, for example, associated maximum values (as the acceptable criteria curves 54) and significant values 56 of the parameter criteria in wind-driven dominated conditions, and in swell dominated conditions. Additionally, parameter groupings, or bins, related to monitored periods may be classified as wind-driven or swell dominated, and assigned a utilization ratio after comparing the significant or maximum value to the appropriate permissible value, or limit. Additional information provided to a user may include a histogram 58 and utilization ratio statistics 60 that may also be of use in determining whether or not to go on location with a unit 2.

The example plot 50 shown in FIG. 7 is intended to convey to the user how close the unit 2 is to the defined acceptable criteria values 54, based on the derived statistics from the onboard instrumentation output data from sensor 18. This information can then be used in determining whether a unit may be installed (e.g., whether the unit 2 may go on location). By incorporating the motion statistics from data of the sensor 18 with the acceptable criteria generated in step 46 and applied in step 44, improved determinations of the feasibility of going on location may be made. Additional embodiments include utilizing a single set of limiting values as the allowable criteria for going on location, whereby the single set is selected as representative of the most onerous condition (i.e., the most conservative). A determination may be made by the control monitor 20 (and an indication thereof may be generated) that going on location by the unit 2 should be undertaken when, for example, the processor 26 determines an amount of motion (or other determined value) of the unit 2 is less than or equal to at least one value (e.g., one or more sets of limiting values as the allowable criteria for going on location, which may be selected as representative of the most onerous condition). Likewise, a determination may be made by the control monitor 20 (and an indication thereof may be generated) that going on location by the unit 2 should not be undertaken when, for example, the processor 26 determines an amount of motion (or other determined value) of the unit 2 is greater than or equal to at least one value (e.g., one or more sets of limiting values as the allowable criteria for going on location, which may be selected as representative of the most onerous condition).

Figure 8:
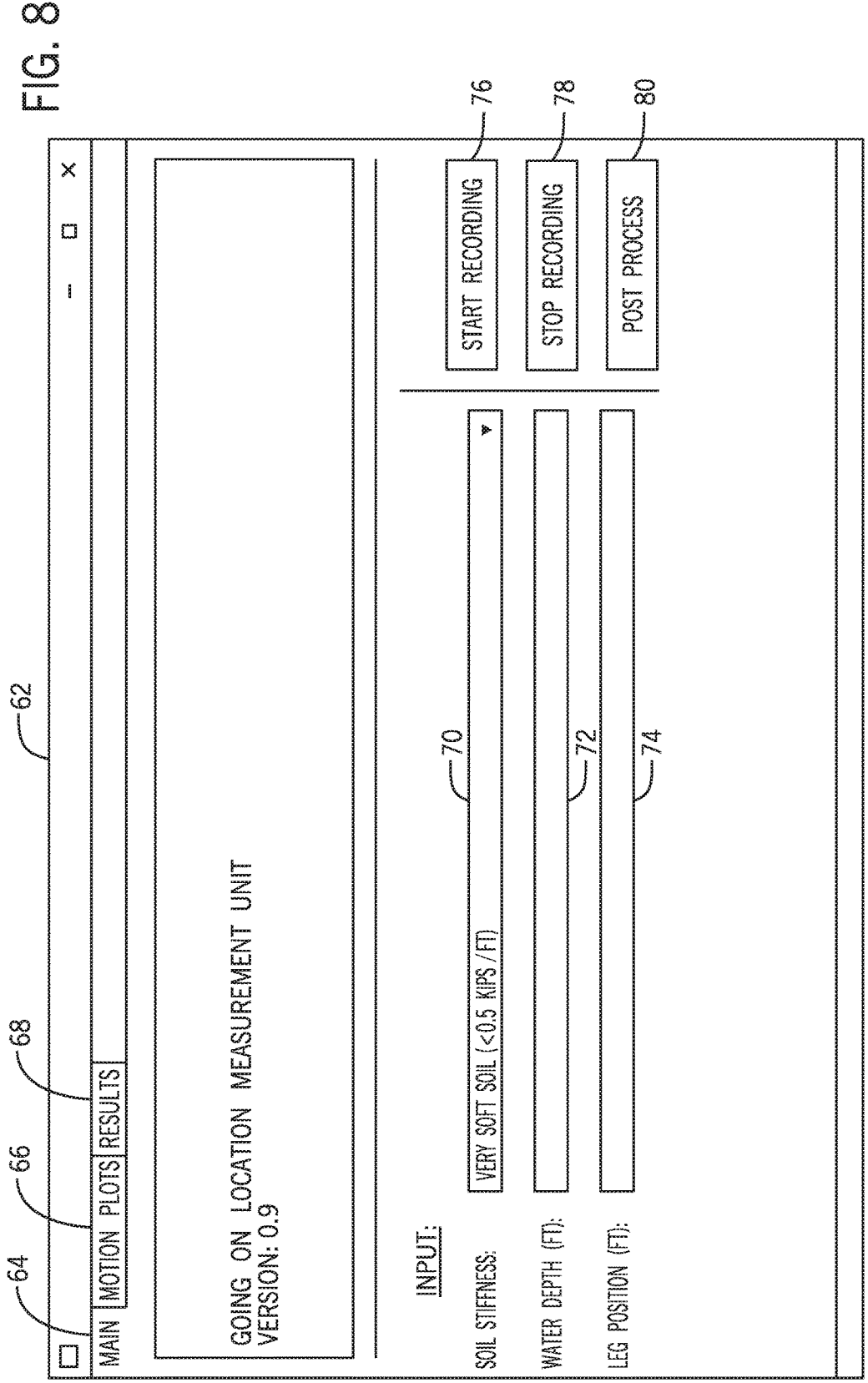
FIG. 8 illustrates a second representative screen shot of a display for use in making a decision for going on location.

Turning to FIG. 8, a representative screen shot of a graphical user interface (GUI) 62 of a display 30 for use in conjunction with making a decision for going on location is illustrated. The GUI 62 may include one or more user interactive tabs 64, 66, 68 that allow for a user to interact with the program of the control system 20 executing one or more of the steps illustrated in FIG. 6. For example, a first tab 64 may indicate to a user that the control monitor 20 is available to receive input values 70, 72, and 74 from a user (e.g., via one or more input structures 32 or via a touch-screen) to control the GUI 62. These input values 70, 72, and 74 may operate to initialize the control system 22 so that the control system 22 is set up for operation in the correct environment. The information entered via input values 70, 72, and 74 may also be used by the control monitor 20 to, for example, filter and/or select acceptable criteria from step 46 of FIG. 6, so that the correct values of acceptable data are applied by the control monitor 20 during the determination of the acceptability of going on location by the unit 2.

As illustrated, input value 72 corresponds to an apparent soil stiffness value related to the relative properties of the seabed 10 (e.g., the composition of the seabed 10). Input value 72 corresponds to a water depth (e.g., the depth of the water from the waterline 8 to the seabed 10) and input value 74 corresponds to the leg position (e.g., the position of a footing 12 of a leg 4 below the baseline of the hull 6). It should be noted that input value 74 may correspond to, for example, an input for multiple leg 4 position values, a single (e.g., average) position value for all legs 4, and/or independent inputs for one or more leg 4 position values, which may be of use when different legs 4 have one or more different positions (e.g., vertical heights). While input values 70, 72, and 74 are illustrated in FIG. 8, it is appreciated that a fewer number or a greater number of input values may be displayed in connection with the GUI 62. Additionally and/or alternatively, other conditions separate from or in addition to those described above may correspond to the input values 70, 72, and 74.

Operational inputs 76, 78, and 80 may also be present in the GUI 62. Operational input 76 may correspond to a start recording input that will begin the process of tracking and/or recording data from the sensor 18 by the control monitor 20. This start recording operational input 76 may initiate a recording interval of a predetermined amount of time or it may initiate a user-selectable recording interval. Operational input 78 may correspond to a stop recording input that will halt the process of tracking and/or recording data from the sensor 18 by the control monitor 20. This stop recording operational input 76 may interrupt a recording interval of a predetermined amount of time or it may terminate a user-selectable recording interval. Also illustrated is a post process operational input 80 that may initiate processing of the recorded data (e.g., step 44 of FIG. 6). While operational inputs 76, 78, and 80 are illustrated in FIG. 8, it is appreciated that a fewer number or a greater number of operational inputs may be displayed in connection with the GUI 62. Additionally and/or alternatively, other operational inputs separate from or in addition to those described above may correspond to the operational inputs 76, 78, and 80.

Figure 9:
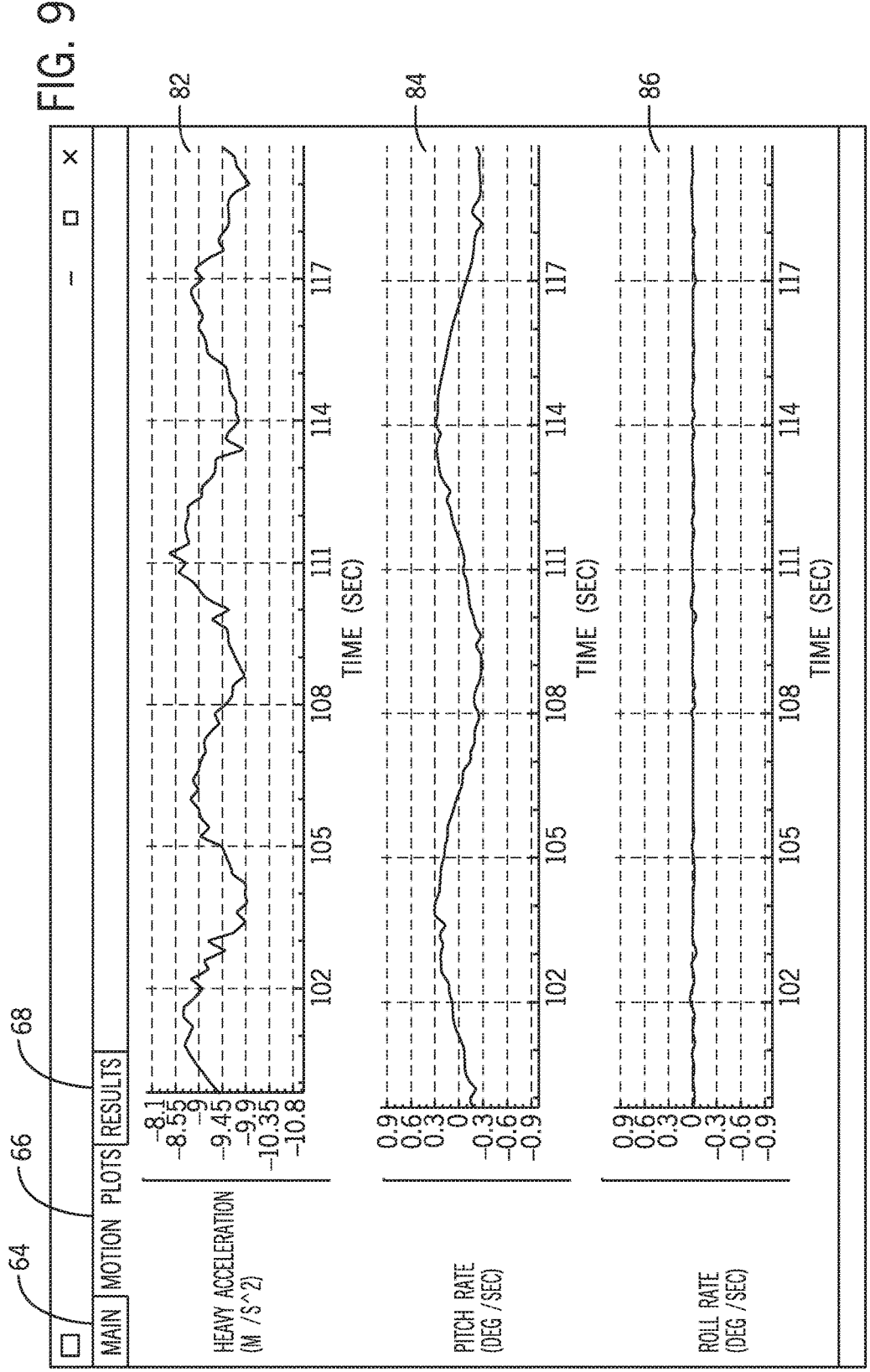
FIG. 9 illustrates a third representative screen shot of a display for use in making a decision for going on location.

FIG. 9 illustrates a representative screen shot of the GUI 62 when the interactive tab 66 is selected. As illustrated, one or more motion plots 82, 84, and 86 are displayed in response to the selection of interactive tab 66. As illustrated, motion plot 82 may correspond to the heave acceleration of the unit 2 as measured by the sensor 18 and/or calculated by the control monitor 20 based on sensed data received from the sensor 18. Similarly, motion plot 84 may correspond to the pitch rate of the unit 2 as measured by the sensor 18 and/or calculated by the control monitor 20 based on sensed data received from the sensor 18. Likewise, motion plot 86 may correspond to the roll rate of the unit 2 as measured by the sensor 18 and/or calculated by the control monitor 20 based on sensed data received from the sensor 18. Each of motion plots 82, 84, and 86 may display data related to the motions of the unit 2 and/or a portion of the unit 2 over time (e.g., over a predetermined recording interval and/or over a current recording interval that may have been initiated via operational input 76). In this manner, the motion plots 82, 84, and 86 may represent currently monitored/sensed data. Alternatively, the motion plots 82, 84, and 86 may represent previously monitored/sensed data that is available for review by a user upon selection of the interactive tab 66. Additionally, while motion plots 82, 84, and 86 are illustrated in FIG. 9, it is appreciated that a fewer number or a greater number of motion plots (or other types of monitored data plots) may be displayed in connection with the GUI 62. Additionally and/or alternatively, other motion plots (or other data plots) separate from or in addition to those described above may correspond to the motion plots 82, 84, and 86.

Figure 10:
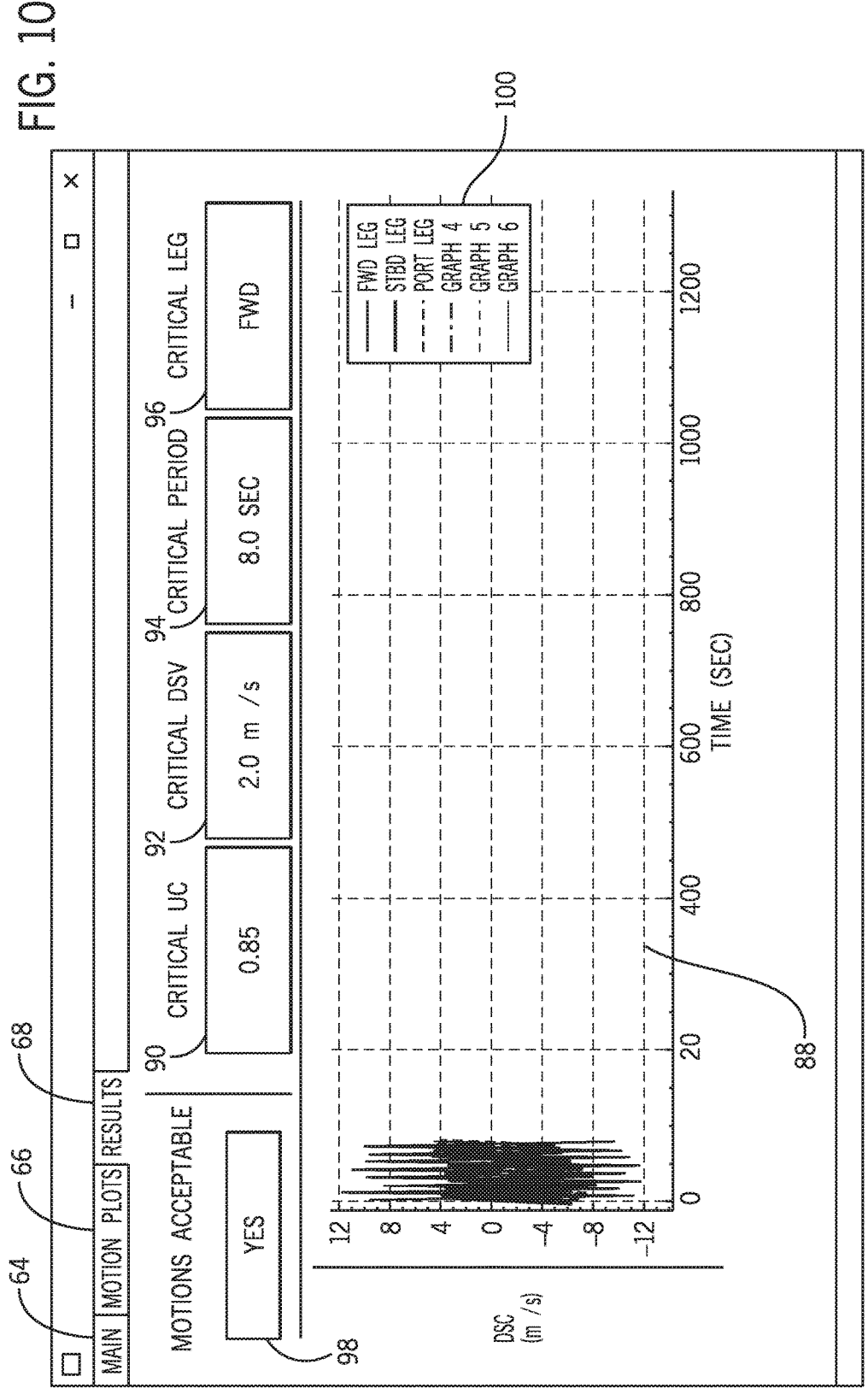
FIG. 10 illustrates a fourth representative screen shot of a display for use in making a decision for going on location.

FIG. 10 illustrates a representative screen shot of the GUI 62 when the interactive tab 68 is selected. As illustrated, the GUI 62 includes a graphical representation 88 and status indicators 90, 92, 94, 96, and 98. The graphical representation 88 may illustrate, for example, downward spudcan velocity (e.g., the velocity of one or more footings 12 during an interval of time) as a visual indication of motion of the footing 12. It should be noted that the graphical representation 88 of downward spudcan velocity is not the only representation that may be present in the graphical representation 88. For example, rotational acceleration of the unit 2 or additional measured motions of the unit 2 may be represented via the graphical representation 88 in addition to or in place of the downward spudcan velocity. The graphical representation 88 may further include a legend 100 that identifies various plots (e.g., by color, thickness, or another visual indicator) for the user to better differentiate measurements represented in the graphical representation 88. The interactive tab 88 and the GUI 62 represented therein may correspond to selection of the operational input 80 and/or the result transmitted in step 48 of FIG. 6.

As noted above, the GUI 62 in FIG. 10 may also include status indicators 90, 92, 94, 96, and 98. Status indicator 90 may, for example, display an indication of how close a measured parameter is to a critical parameter via a ratio (e.g., a ratio of the motion of the unit 2 or a portion thereof against an acceptable criteria value). The indication in status indicator 90 may be selected by the control monitor 20 or a user to represent the measured parameter that is closest to its relevant acceptable criteria. Status indicator 92 may, for example, display an indication of the downward spudcan velocity of a footing 12 as measured against an acceptable criteria. Likewise, status indicator 94 may, for example, display an indication of a period (e.g., an oscillation period of the response of the unit 2 due the presence of the waves or the like). The indication in status indicator 94 may be selected by the control monitor 20 or a user to represent the measured period that is closest to its relevant acceptable criteria. Additionally, status indicator 96 may, for example, display an indication of which leg 4 is experiencing the most motion, is closest to its respective acceptable criteria, or is closest to the seafloor 10, or the like. The indication in status indicator 96 may be selected by the control monitor 20 or a user.

In addition to the status indicators 90, 92, 94, and 96, the control monitor 20 may generate an indication of whether the measured motions are acceptable, as represented by status indicator 98. The GUI 62 may, thus, represent whether conditions are acceptable to go on location via the status indicator 98, which may include text, color, or another indicator to provide positive or negative feedback as to whether the unit 2 can go on location. Auditory indications may also accompany the status indicator 98 to further aid in recognition of the feasibility of going on location. Additionally, the indicator 98 may indicate that automatic control and/or deployment of the legs 4 has begun in a going on location operation, if the process of going on location is automated and/or mechanically controlled. In addition to generating and transmitting a signal that controls status indicator 98, the control system 22 may control the automated going on location of the unit 2 either directly (e.g., via generation and transmission of one or more control signals) or via transmission of a start signal or an authorization signal to a jacking system of the unit 2, for example, to control or to be utilized in the control of the jacking system and/or as a safety control of the jacking system. Additionally, the control system 22 may determine if and which leg 4 is moving at a greater rate towards to seafloor 10 and generate a signal to identify that leg 4 and/or control the rate of descent of the identified leg 4 and/or the remaining legs 4 to counteract the detection of the rate differential.

The present embodiments may alleviate potential issues that may arise on self-elevating units 2, wherein rotations are determined manually from readings on a bubble inclinometer (which may lead to erroneous and inconsistent readings due to, for example, user and/or instrument errors). Further errors resulting from bubble readings affected (e.g., exaggerated) by inertia when the oscillation periods are small may also be reduced and/or eliminated through the use of the control system 22. Additionally, acceptable criteria for going on location may be set by the environment, or the allowable sea-state, and typically is defined by wave height. Because the motions of the unit 2, and thus, the footings 12, are determined by the control system 22, assumptions regarding wave excitation load and other hydrodynamic coefficients as part of a diffraction analysis may be avoided, since actual motions of the unit 2 are measured. Likewise, separate criteria for going on location may be based upon whether waves are regular or random. To use the criteria properly (either the criteria for regular or random waves), a determination of whether the sea-state is made up of swells, typically represented by regular waves, or wind-driven waves, typically represented by random waves should be made. Moreover, in a majority of locations, both swells and wind-driven waves are present, making it difficult to determine the proper criteria for installing the unit 2. However, through use of the control system 22, and more specifically, the use of the data gathered by sensor 18 related to the motions of the unit 2, the issues related to choosing of the correct criteria may be reduced by a more accurate criteria selection, since the motions of the unit 2 due to swells and/or wind-driven waves may be more accurately measured and compared to the theoretical values, or the sea state may not be a consideration at all as only resulting motions of the unit 2 are of consequence to the control system 22.

It should be noted that the one or more sensors 18 may also include one or more environmental sensors that are able to measure metocean (e.g., meteorology and (physical)

oceanography) conditions. This data may be used separately from (e.g., independently of) or in combination with (e.g., in parallel with) the motion data of the unit 2. For example, a determination may be made by the control monitor 20 (and an indication thereof may be generated) that going on location by the unit 2 should be undertaken when, for example, the processor 26 determines that an amount of motion (or other determined value) of the unit 2 is less than or equal to at least one value (e.g., one or more sets of limiting values inclusive of metocean data as the allowable criteria for going on location, which may be selected as representative of the most onerous condition). Likewise, a determination may be made by the control monitor 20 (and an indication thereof may be generated) that going on location by the unit 2 should not be undertaken when, for example, the processor 26 determines an amount of motion (or other determined value) of the unit 2 is greater than or equal to at least one value (e.g., one or more sets of limiting values inclusive of metocean data as the allowable criteria for going on location, which may be selected as representative of the most onerous condition). This determination inclusive of metocean may be performed as a separate set of steps similar to those outlined in FIG. 6 (e.g., steps 38, 44, 46, and 48 of FIG. 6 may be performed using sensed metocean data separate from motion data in a manner similar to that described above with respect to FIG. 6) either in parallel with the steps performed in FIG. 6, in series with the steps performed in FIG. 6, or in place of the steps performed in FIG. 6 with respect to measured motion data.

Likewise, use of one or more environmental sensors as sensor 18 that are able to measure metocean conditions can be used when the unit 2 is coming off location (e.g., transitioning from an elevated mode to an afloat mode). Prior to initiating the coming off location transition, the unit 2 may use the sensor 18 to obtain data indicative of metocean conditions. This data may be transmitted, for example, to the control monitor 20 for determination of metocean conditions based on the received data through, for example, generation of statistics of interest. These statistics of interest may be compared against acceptable criteria (which may be previously and/or simultaneously calculated and stored in the control monitor 20 or may be received and stored at the control monitor 20, for example, from cloud based or other external storage device). This comparison may include a comparison of critical statistics against one or more appropriate permissible curves to aid in the decision for coming off location.

Given the comparison, display of the results of the comparison may be made, for example, to make a proper recommendation for whether conditions are favorable for coming off location. For example, analytical results generated based on the comparison may be used to provide a statistical exceedance probability that may be displayed, for example, on the display 30 or transferred, for example, via the network interface 34 for display on another display in the unit 2 and/or at a location remote from the unit 2 (e.g., a remote monitoring center). The display of information may include the display of the statistics in such a way that the user easily discerns the dominant response and/or the variations in the response, as well as trends over time (e.g., current statistics moving towards or away from critical statistic levels). By comparing the metocean data of the sensor 18 with acceptable criteria, improved determinations of the feasibility of coming off location may be made. Additional embodiments include utilizing a single set of limiting values as the allowable criteria for coming off location, whereby the single set is selected as representative of the most onerous condition (i.e., the most conservative). A determination may be made by the control monitor 20 (and an indication thereof may be generated) that coming off location by the unit 2 should be undertaken when, for example, the processor 26 determines that the metocean conditions are less than or equal to at least one value (e.g., one or more sets of limiting values as the allowable criteria for coming off location, which may be selected as representative of the most onerous condition). Likewise, a determination may be made by the control monitor 20 (and an indication thereof may be generated) that coming off location by the unit 2 should not be undertaken when, for example, the processor 26 determines the metocean conditions are greater than or equal to at least one value (e.g., one or more sets of limiting values as the allowable criteria for coming off location, which may be selected as representative of the most onerous condition).

The control monitor 20 may generate an indication (via GUI 62) of whether the measured metocean conditions are acceptable. The GUI 62 may, thus, represent whether conditions are acceptable to come off location via a status indicator, which may include text, color, or another indicator to provide positive or negative feedback as to whether the unit 2 can come off location. Auditory indications may also accompany the status indicator to further aid in recognition of the feasibility of coming off location. Additionally, the indicator may indicate that automatic control and/or retraction of the legs 4 has begun in a coming off location operation, if the process of coming off location is automated and/or mechanically controlled. In addition to generating and transmitting a signal that controls the status indicator, the control system 22 may control the automated coming off location of the unit 2 either directly (e.g., via generation and transmission of one or more control signals) or via transmission of a start signal or an authorization signal to a jacking system of the unit 2, for example, to control or to be utilized in the control of the jacking system and/or as a safety control of the jacking system.

This written description uses examples to disclose the above description to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Accordingly, while the above disclosed embodiments may be susceptible to various modifications and alternative forms, specific embodiments have been shown by way of example in the drawings and have been described in detail herein. However, it should be understood that the embodiments are not intended to be limited to the particular forms disclosed. Rather, the disclosed embodiment are to cover all modifications, equivalents, and alternatives falling within the spirit and scope of the embodiments as defined by the following appended claims.

What is claimed is:
1. A device, comprising:
   an interface configured to receive a signal indicative of a measured motion of an offshore unit when the offshore unit is disposed in an afloat mode in which legs of the offshore unit are disposed above a seabed;

a memory configured to store a set of values corresponding to acceptable motions of the offshore unit when the offshore unit is in the afloat mode; and a processor configured to:
  determine if the measured motion of the offshore unit indicated by the signal exceeds at least one value of the set of values; and
  generate an indication to begin a going on location operation by the offshore unit inclusive of transitioning the offshore unit from the afloat mode to an elevated mode of the offshore unit in which the legs of the offshore unit are coupled to the seabed when the processor determines that the measured motion of the offshore unit is less than or equal to the at least one value.

2. The device of claim 1, wherein the processor is configured to generate a second indication that going on location by the offshore unit should not be undertaken when the processor determines that the measured motion of the offshore unit is greater than the at least one value.

3. The device of claim 1, wherein the interface is configured to receive the set of values as a predetermined set of values corresponding to at least one physical characteristic of the offshore unit.

4. The device of claim 1, wherein the interface is configured to receive the set of values as a predetermined set of values corresponding to environmental conditions.

5. The device of claim 1, wherein the processor is configured to determine the measured motion of the offshore unit based on the signal.

6. The device of claim 1, comprising a display configured to display a graphical user interface (GUI), wherein the processor is configured to transmit the indication to the display for display thereon in conjunction with the GUI.

7. The device of claim 1, wherein the indication is configured to initiate control of an automated implementation of the going on location operation.

8. A system, comprising:
  a sensor configured to measure motions of an offshore unit when the offshore unit is disposed in an afloat mode in which legs of the offshore unit are disposed above a seabed and generate a signal indicative of the measured motions of the offshore unit; and
  a control monitor configured to be coupled to the sensor, wherein the control monitor comprises:
    an interface configured to receive the signal indicative of the measured motions of an offshore unit;
    a memory configured to store a set of values corresponding to acceptable motions of at least one portion of the offshore unit when the offshore unit is in the afloat mode; and
    a processor configured to:
      determine if the measured motions of at least one portion of the offshore unit indicated by the signal exceeds at least one value of the set of values; and
      generate an indication to begin a going on location operation by the offshore unit inclusive of transitioning the offshore unit from the afloat mode to an elevated mode of the offshore unit in which the legs of the offshore unit are coupled to the seabed when the processor determines that the the measured motions of the at least one portion of the offshore unit is less than or equal to the at least one value.

9. The system of claim 8, wherein the processor is configured to determine the motion of the at least one portion of the offshore unit as motion of a hull of the offshore unit based on the signal.

10. The system of claim 8, wherein the processor is configured to determine the motion of the at least one portion of the offshore unit as motion of a leg of the offshore unit based on the signal.

11. The system of claim 8, wherein the processor is configured to determine the motion of the at least one portion of the offshore unit as motion of a footing of the offshore unit based on the signal.

12. The system of claim 8, wherein the processor is configured to generate an indication that going on location by the offshore unit should not be undertaken when the processor determines that the motion of the offshore unit is greater than the at least one value.

13. The system of claim 8, wherein the control monitor is configured to transmit a control signal or a start signal to a jacking system of the offshore unit in response to generation of the indication to control an aspect of operation of the jacking system or initiate operation of the jacking system.

14. The system of claim 8, comprising a display separate from and coupled to the control monitor and configured to display a graphical user interface (GUI), wherein the display is configured to receive the indication for display thereon in conjunction with the GUI.

15. The system of claim 8, wherein the control monitor comprises a display configured to display a GUI, wherein the processor is configured to transmit the indication to the display for display thereon in conjunction with the GUI.

16. A tangible non-transitory computer-readable medium having computer executable code stored thereon, the code comprising instructions to cause a processor to:
  receive a signal indicative of motion of an offshore unit when the offshore unit is disposed in an afloat mode in which legs of the offshore unit are disposed above a seabed;
  receive a predetermined value corresponding to acceptable motions of the offshore unit when the offshore unit is in the afloat mode;
  determine if the motion of the offshore unit indicated by the signal exceeds the predetermined value; and
  generate an indication to begin a going on location operation by the offshore unit inclusive of transitioning the offshore unit from the afloat mode to an elevated mode of the offshore unit in which the legs of the offshore unit are coupled to the seabed when the processor determines that the motion of the offshore unit is less than or equal to the at least one value.

17. The tangible non-transitory computer-readable medium of claim 16, wherein the code comprises instructions to generate a graphical user interface (GUI) to be displayed on the display.

18. The tangible non-transitory computer-readable medium of claim 17, wherein the code comprises instructions to generate a status indicator in conjunction with the GUI, wherein the status indicator represents the generated indication that going on location by the offshore unit can be undertaken.

19. The tangible non-transitory computer-readable medium of claim 17, wherein the code comprises instructions to receive user input via in conjunction with the GUI, wherein the user input is related to at least one condition of the offshore unit or at least one environmental condition.

20. The tangible non-transitory computer-readable medium of claim 17, wherein the code comprises instructions to generate a representation of the motion of the offshore unit in conjunction with the GUI.

* * * * *